United States Patent
Li et al.

(10) Patent No.: US 11,414,578 B2
(45) Date of Patent: Aug. 16, 2022

(54) SOLVENT BASED ADHESIVE COMPOSITIONS

(71) Applicants: Dow Global Technologies LLC, Midland, MI (US); Rohm and Haas Company, Collegeville, PA (US)

(72) Inventors: Wenwen Li, Pearland, TX (US); Joseph J. Zupancic, Glen Ellyn, IL (US); Ludwik S. Cygan, Downers Grove, IL (US)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 225 days.

(21) Appl. No.: 16/639,661

(22) PCT Filed: Jun. 28, 2018

(86) PCT No.: PCT/US2018/040044
§ 371 (c)(1),
(2) Date: Feb. 17, 2020

(87) PCT Pub. No.: WO2019/045868
PCT Pub. Date: Mar. 7, 2019

(65) Prior Publication Data
US 2020/0248053 A1 Aug. 6, 2020

Related U.S. Application Data

(60) Provisional application No. 62/551,809, filed on Aug. 30, 2017.

(51) Int. Cl.
| | |
|---|---|
| C08G 18/40 | (2006.01) |
| C08G 18/48 | (2006.01) |
| C08G 18/42 | (2006.01) |
| C09J 175/08 | (2006.01) |
| B65D 65/40 | (2006.01) |
| C08G 18/38 | (2006.01) |
| C08G 18/66 | (2006.01) |
| C08G 18/76 | (2006.01) |

(52) U.S. Cl.
CPC ............ *C09J 175/08* (2013.01); *B65D 65/40* (2013.01); *C08G 18/3885* (2013.01); *C08G 18/4018* (2013.01); *C08G 18/42* (2013.01); *C08G 18/4829* (2013.01); *C08G 18/6666* (2013.01); *C08G 18/7671* (2013.01)

(58) Field of Classification Search
CPC ............ C09J 175/08; C08G 18/3885; C08G 18/4018; C08G 18/4829; C08G 18/6666; C08G 18/7671
See application file for complete search history.

(56) References Cited

U.S. PATENT DOCUMENTS

| | | | |
|---|---|---|---|
| 4,426,487 A | 1/1984 | Konig et al. | |
| 4,830,923 A * | 5/1989 | Sumiya | G11B 5/7022 428/425.9 |
| 5,202,391 A | 4/1993 | Yamazaki et al. | |
| 5,254,432 A * | 10/1993 | Aoai | G03F 7/0233 528/72 |
| 6,022,913 A | 2/2000 | Tanaka et al. | |
| 6,238,783 B1 | 5/2001 | Komai et al. | |
| 9,139,690 B2 | 9/2015 | Schmidt | |
| 9,321,935 B2 | 4/2016 | Seneker et al. | |

(Continued)

FOREIGN PATENT DOCUMENTS

| | | |
|---|---|---|
| EP | 1277876 A2 | 1/2003 |
| JP | 2004306368 A | 11/2004 |

(Continued)

OTHER PUBLICATIONS

PCT/US2018/040044, Search Report and Written Opinion dated Aug. 24, 2018.

(Continued)

*Primary Examiner* — Michael L Leonard

(57) ABSTRACT

Solvent-based adhesive compositions are disclosed herein. In some embodiments, the solvent-based adhesive compositions include (A) an isocyanate component comprising an isocyanate curing agent and (B) a hydroxyl component comprising a polyester polyol, a polyether polyol, and a phosphate ester compound. The isocyanate curing agent of the isocyanate component (A) crosslinks the components of the hydroxyl component. In some embodiments, the phosphate ester compound has the structure (I): (I) wherein R1 is any organic group. Methods for preparing solvent-based adhesive compositions are also disclosed. The methods include providing an isocyanate component (A) comprising an isocyanate curing agent, providing a hydroxyl component (B) comprising a polyol blend, comprising a polyester polyol and a polyether polyol, and a phosphate ester compound, curing the hydroxyl component (B) with the isocyanate component (A) at a mix ratio ((A):(B), by weight) of from 100:8 to 100:15, thereby forming the solvent-based adhesive composition.

(I)
$$\begin{array}{c}\text{HO}\\ \phantom{x}\diagdown\\ \phantom{xxx}R^1-\text{O}-\overset{\overset{\displaystyle O}{\|}}{\underset{\underset{\displaystyle \text{OH}}{|}}{P}}-\text{OH,}\\ \text{HO}\diagup\end{array}$$

8 Claims, No Drawings

(56) References Cited

U.S. PATENT DOCUMENTS

| | | | | |
|---|---|---|---|---|
| 2012/0156506 A1* | 6/2012 | Shah | ............... | C08G 18/4829 |
| | | | | 156/331.7 |
| 2017/0369625 A1* | 12/2017 | Casarrubias | ........... | C09J 175/08 |
| 2020/0181467 A1* | 6/2020 | Xie | ...................... | C09J 175/08 |

FOREIGN PATENT DOCUMENTS

| JP | 2012031224 A | 2/2012 |
|---|---|---|
| WO | 2013047378 A1 | 4/2013 |
| WO | 2015168670 A1 | 11/2015 |
| WO | 2016077355 A1 | 5/2016 |

OTHER PUBLICATIONS

PCT/US2018/040044, International Preliminary Reporton Patentability dated Mar. 3, 2020.

* cited by examiner

SOLVENT BASED ADHESIVE COMPOSITIONS

REFERENCE TO RELATED APPLICATIONS

The present application claims the benefit of U.S. Provisional Application No. 62/551,809, filed on Aug. 30, 2017.

FIELD OF THE DISCLOSURE

The instant disclosure relates to solvent-based adhesive compositions. More particularly, the disclosure relates to solvent-based adhesive compositions for use in, for example, high-performance laminating adhesive applications, the compositions exhibiting improved adhesion to metal substrates, such as foils, and improved heat and chemical resistance. The solvent-based adhesive compositions include a two-component system having a hydroxyl component modified with a phosphate ester compound, and an isocyanate component having an isocyanate curing agent. The disclosure further relates to methods for preparing such solvent-based adhesive compositions.

BACKGROUND AND SUMMARY OF THE DISCLOSURE

Adhesive compositions are useful for a wide variety of purposes. For instance, some adhesives are used to adhere layers of substrates together, thereby forming laminate structures comprising two or more substrate layers. Flexible packaging laminating adhesives are applied between laminating films for packaging of foodstuffs, pharmaceuticals, and industrial consumables. Laminating adhesives can be classified generally into three categories: (1) solvent-based laminating adhesives, (2) solventless laminating adhesives, and (3) water-based laminating adhesives. Within the solvent-based category, solvent-based polyurethane has been widely used to achieve relatively good heat, moisture, and chemical resistance.

Solvent-based adhesive compositions can be used in high-performance laminate applications (e.g., retort, hot-fill, boil-in-bag, etc.). In order to achieve the high performance required for such applications, polyester systems including epoxidized bisphenol-A are commonly used. The use of bisphenol-A epoxy resins has recently encountered regulatory and user challenges regarding the perceived safety of bisphenol-A-based materials for food packaging.

Accordingly, bisphenol-A-free adhesive compositions suitable for high-performance applications, particularly for use in laminate structures used in high performance applications, and more particularly those containing an aluminum foil substrate, are desirable.

Solvent-based adhesive compositions are disclosed herein. In some embodiments, the solvent-based adhesive compositions include (A) an isocyanate component comprising an isocyanate curing agent and (B) a hydroxyl component comprising a polyester polyol, a polyether polyol, and a phosphate ester compound. The isocyanate curing agent of the isocyanate component (A) crosslinks the components of the hydroxyl component. In some embodiments, the phosphate ester compound has the structure (I):

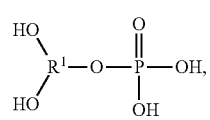

wherein $R^1$ is any organic group.

Methods for preparing solvent-based adhesive compositions are also disclosed. The methods include providing an isocyanate component (A) comprising an isocyanate curing agent, providing a hydroxyl component (B) comprising a polyol blend, comprising a polyester polyol and a polyether polyol, and a phosphate ester compound, curing the hydroxyl component (B) with the isocyanate component (A) at a mix ratio ((A):(B), by weight) of from 100:8 to 100:15, thereby forming the solvent-based adhesive composition.

The disclosed adhesive compositions are bisphenol-A-free and are suitable for use in, among other things, laminate structures used in high-performance food packaging applications, such as retort applications, hot-fill applications, and boil-in-bag applications. The disclosed adhesive compositions are particularly suitable for laminate structures used in high performance applications.

DETAILED DESCRIPTION OF THE DISCLOSURE

The solvent-based adhesive compositions disclosed herein are suitable for use in laminate structures comprising two or more flexible or rigid substrates. In some embodiments, the substrates can include low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. In some embodiments, laminate structures prepared using the disclosed solvent-based adhesive compositions can comprise multiple substrates (or "layers"), each substrate being any one of the materials described herein, and the like.

The adhesive compositions are particularly suitable for use in laminate structures subjected to retort processing (e.g., exposure to temperatures of 120° C. or higher for 30 or more minutes), hot-fill processing (e.g., exposure to temperatures of 66° C. or higher for 30 or more minutes), and boil-in-bag processing (e.g., exposure to temperatures of 100° C. or higher for 30 or more minutes), i.e., high-performance applications. In some embodiments, the solvent-based adhesive compositions can be used in food pouches, ready-to-eat meals, lidding, etc.

In some embodiments, the solvent-based adhesive compositions include (A) an isocyanate component (also referred to herein as "Side A") comprising an isocyanate curing agent and (B) a hydroxyl component (also referred to herein as "Side B") comprising a polyester polyol, a polyether polyol, and a phosphate ester compound. The isocyanate curing agent of the isocyanate component (A) crosslinks the components of the hydroxyl component (B), thereby generating a polyester-polyurethane polymer network.

The isocyanate component (A) and hydroxyl component (B) of the disclosed adhesive compositions are mixed prior to contacting a substrate (e.g., when applied on a laminating machine). The mixed adhesive is applied to one substrate and dried or allowed to dry before another layer of substrate is applied.

Isocyanate Component (A): Isocyanate Curing Agent

In some embodiments, the solvent-based adhesive compositions include an isocyanate component comprising (A)

an isocyanate curing agent. In some embodiments, the isocyanate curing agent is an isocyanate-terminated polyurethane prepolymer. In some embodiments, the isocyanate curing agent is an isocyanate-terminated polyurethane prepolymer based on, i.e., is the reaction product of, a polyester polyol and an isocyanate (e.g., a monomeric isocyanate and/or a polyisocyanate). In some embodiments, the isocyanate curing agent is an isocyanate-terminated polyurethane prepolymer based on a polyether polyol and an isocyanate. In some embodiments, the isocyanate curing agent is an isocyanate-terminated polyurethane prepolymer based on a blend comprising a polyester polyol and a polyether polyol, and an isocyanate. As used herein, a "polyisocyanate" is any compound that contains two or more isocyanate groups. As used herein, "polyol" refers to a compound having two or more hydroxy groups (i.e., —OH) per molecule. As used herein, "ester" refers to a compound that contains an ester linkage. As used herein, "polyester" refers to a compound that contains two or more ester linkages per molecule. A compound that is both a polyester and a polyol is a "polyester polyol."

Suitable isocyanates for use according to this disclosure include, but are not limited to, aromatic isocyanates, aliphatic isocyanates, cycloaliphatic isocyanates, and combinations of thereof. An "aromatic isocyanate" is an isocyanate that contains an isocyanate radical bonded to an aromatic radical and contains one or more aromatic rings. An "aliphatic polyisocyanate" is an isocyanate that contains an isocyanate radical bonded to an aliphatic radical which can be bonded to other aliphatic groups, a cycloaliphatic radical, or an aromatic ring (radical). A "cycloaliphatic polyisocyanate" is a subset of aliphatic isocyanates, wherein the chemical chain is ring-structured.

Suitable aromatic isocyanates include, but are not limited to, 1,3- and 1,4-phenylene diisocyanate, 1,5-naphthylene diisocyanate, 2,6-tolulene diisocyanate ("2,6-TDI"), 2,4-tolulene diisocyanate ("2,4-TDI"), 2,4'-diphenylmethane diisocyanate ("2,4'-MDI"), 4,4'-diphenylmethane diisocyanate ("4,4'-MDI"), 3,3'-dimethyl-4,4'-biphenyldiisocyanate ("TODI"), and combinations thereof.

Suitable aliphatic isocyanates have 3 to 16 carbon atoms, or 4 to 12 carbon atoms, in the linear or branched alkylene residue, such as hexamethylene diisocyanate ("HDI"), 1,4-Diisocyanatobutane, 1,3-xylylene diisocyanate ("1,3-XDI"), and 1,4-xylylene diisocyanate ("1,4-XDI"). Suitable cycloaliphatic isocyanates have 4 to 18 carbon atoms, or 6 to 15 carbon atoms, in the cycloalkylene residue. Cycloaliphatic diisocyanates refer to both cyclically and aliphatically bound NCO groups, such as isophorone diisocyanate ("IPDI"), 1,3/1,4-diisocyanatocyclohexane 1,3-/1,4-bis(isocyanatomethyl)cyclohexane, diisocyanatodicyclohexylmethane ("$H_{12}$MDI"), and combinations thereof.

Suitable aliphatic and cycloaliphatic isocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate ("TIN"), decane di- and triisocyanate, undecane di- and triisocyanate and dodecane di- and triisocyanate, isophorone diisocyanate ("IPDI"), hexamethylene diisocyanate ("HDI"), diisocyanatodicyclohexylmethane ("$H_{12}$MDI"), 2-methylpentane diisocyanate ("MPDI"), 2,2,4-trimethylhexamethylene diisocyanate/2,4,4-trimethylhexamethylene diisocyanate ("TMDI"), norbornane diisocyanate ("NBDI"), xylylene diisocyanate ("XDI"), tetramethylxylylene diisocyanate, and dimers, trimers, and combinations thereof.

Additional isocyanates suitable for use according to this disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and combinations thereof.

In some embodiments, the isocyanate-terminated polyurethane prepolymer has a NCO content of from 2.44 to 2.75 weight percent, as measured according to AFP-3003. In some embodiments, the isocyanate-terminated polyurethane prepolymer has a viscosity of from 3,000 to 4,400 mPa·s, as measured according to ASTM D2196.

Commercially available examples of isocyanate components (A) suitable for use according to this disclosure include adhesives sold under the name ADCOTE™, such as ADCOTE™ 577, by The Dow Chemical Company.

Hydroxyl Component (B): Polyols

In some embodiments, the hydroxyl component (B) comprises a polyester polyol. In some embodiments, the hydroxyl component (B) comprises a polyether polyol. In some embodiments, the hydroxyl component (B) comprises a blend of a polyester polyol and a polyether polyol. In some embodiments, the polyol has a hydroxyl number (OHN) of from 100 to 220, or from 150 to 200.

In some embodiments, the polyester polyol is based upon reaction product of a combination of adipic acid, azelaic acid, sebacic acid, phthalic anhydride, isophthalic acid, terephthalic acid, 1,4-cylcohexanedicarboxylic acid, 1,3-cylcohexanedicarboxylic acid, maleic acid, fumaric acid, and/or the like, with ethylene glycol, diethylene glycol, 2-methyl-1,3-propanediol, Neopentyl glycol, 1,4-butanediol, 1,6-hexanediol, 1,4-cyclohexanedimethanol, propylene glycol, triethyleneglycol, trimethylolethane, trimethylolpropane, glycerol, polyethylene glycol, polypropylene glycol, and/or the like. In some embodiments, the polyester polyol has a hydroxyl number (OHN) of from 60 to 250, or from 100 to 200, or from 125 to 150. In some embodiments, the polyester polyol has a molecular weight (Mn) of from 450 to 2,000, or from 600 to 1,200, or from 750 to 900. In some embodiments, the polyester polyol has a viscosity of from 300 to 4,000 cps, or from 2,000 to 3,000 cps, or from 1,500 to 2,500 cps.

In some embodiments, the polyether polyol has a hydroxyl number (OHN) of from 50 to 700. In some embodiments, the polyether polyol has a molecular weight (Mn) of from 240 to 2,300.

In some embodiments, where the hydroxyl component (B) comprises a polyester polyol and a polyether polyol, the polyester polyol accounts for from 30 to 65 percent by weight of the total weight of the hydroxyl component (B), and the polyether polyol accounts for from 5 to 35 percent by weight of the total weight of the hydroxyl component (B). In some embodiments, where the hydroxyl component (B) comprises a polyester polyol and a polyether polyol, the total weight of the polyester polyol and the polyether polyol accounts for from 35 to 90 percent by weight of the total weight of the hydroxyl component (B).

Commercially available examples of polyols suitable for use in the hydroxyl component (B) according to this disclosure include those sold under the names POLY-G™, such as POLY-G™ 30-112, by Monument Chemical, PLURACOL™, such as PLURACOL™ GP-430 and PLURACOL™ TP440, by BASF SE.

Hydroxyl Component (B): Phosphate Ester Compound

In some embodiments, the hydroxyl component (B) comprises a phosphate ester compound. Without being bound to theory, it is thought that the phosphate ester compound and the polyols of the hydroxyl component (B) react with the isocyanate curing agent of the isocyanate component (A) through reaction between the hydroxyl groups with the isocyanate functionality to generate a homogeneous polyester-polyurethane network. In addition, the phosphate ester functionalities of the phosphate ester compound react/complex with reactive sites on metal films, metal oxide coated films, and/or polymer films to improve adhesion.

In some embodiments, the phosphate ester compound accounts for from 0.5 to 25 percent by weight of the total weight of the hydroxyl component (B). In some embodiments, the phosphate ester accounts for from 1 to 15 percent by weight of the total weight of the hydroxyl component (B).

In some embodiments, the phosphate ester compound has the structure (I):

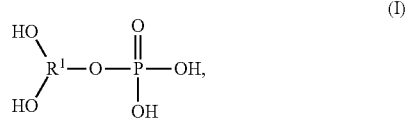

where $R^1$ is any organic group. In addition to the pendant groups shown in structure (I), $R^1$ may or may not have one or more additional pendant —OH groups, and $R^1$ may or may not have one or more additional pendant groups of structure (I). Any two or more of the —OH groups and the group(s) of structure (I) may or may not be attached to the same atom of $R^1$. Preferably, each —OH group and each group of structure (I) is attached to a separate atom of $R^1$.

A convenient way to characterize $R^1$ is to describe the compound having structure (II):

where $R^1$ is the same as in structure (I). The compound having structure (II) is known herein as a "precursor polyol."

In some embodiments, suitable precursor polyols have number average molecular weight of 90 or higher, or 200 or higher, or 400 or higher. In some embodiments, suitable precursor polyols have number average molecular weight of 4,000 or lower, or 2,000 or lower, or 1,200 or lower, or 900 or lower, or 500 or lower. In some embodiments, suitable precursor polyols have number average molecular weight of from 200 to 4,000, or from 400 to 2,000, or from 400 to 1,200, or from 400 to 900.

In some embodiments, suitable precursor polyols are alkyl higher polyols, monosaccharides, disaccharides, and compounds having structure (III):

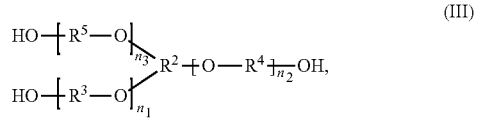

where each of $R^2$, $R^3$, $R^4$, and $R^5$ is, independent of the other, any organic group; each of $n_1$, $n_2$, and $n_3$ is, independent of the other, an integer from 0 to 10. In addition to the pendant groups shown in structure (III), $R^2$ may or may not have one or more additional pendant groups. It is further understood that any two or more of the pendant groups may or may not be attached to the same atom of $R^2$. In some embodiments, a mixture of compounds having structure (III) is present, where the compounds of structure (III) differ from each other in the value of one or more of $n_1$, $n_2$, and $n_3$. Such mixtures are described herein by stating a non-integer value for the parameter $n_1$, $n_2$, or $n_3$, where the non-integer value represents the number average of that parameter. When it is desired to assess the molecular weight of such a mixture, the number-average molecular weight is used.

Among precursor polyols having structure (III), preferably each pendant group is attached to a separate atom of $R^2$.

Among precursor polyols having structure (III), preferably, one or more of $R^3$, $R^4$, and $R^5$ is a hydrocarbon group having 1 to 4 carbon atoms, or 2 to 3 carbon atoms, or 3 carbon atoms. Among precursor polyols having structure (III), preferably, one or more of $R^3$, $R^4$, and $R^5$ is an alkyl group, which may be linear or cyclic or branched or a combination thereof; more preferably, one or more of $R^3$, $R^4$, and $R^5$ is a linear or branched alkyl group; more preferably, one or more of $R^3$, $R^4$, and $R^5$ is a branched alkyl group. Preferably, $R^3$, $R^4$, and $R^5$ are identical to each other.

Among precursor polyols having structure (III), preferably, one or more of $n_1$, $n_2$, and $n_3$ is from 0 to 8. Among precursor polyols having structure (III), preferably, one or more of $n_2$, and $n_3$ is 1 or more. Among precursor polyols having structure (III), preferably, one or more of $n_1$, $n_2$, and $n_3$ is 6 or less. Among precursor polyols having structure (III), preferably, $n_1$, $n_2$, and $n_3$ are the same as each other.

A preferred group of precursor polyols having structure (III) are compounds in which each of $R^2$, $R^3$, $R^4$, and $R^5$ is an alkyl group; such precursor polyols are known herein as alkoxylated alkyl triols. In a triol, when at least one of $n_1$, $n_2$, and $n_3$ is 1 or more and $R^2$ has the structure (IV):

then the triol is known herein as an alkoxylated glycerol. In alkoxylated triols, when each of $R^3$, $R^4$, and $R^5$ is a branched alkyl group with exactly 3 carbon atoms, the alkoxylated triol is known herein as a propoxylated triol. A propoxylated triol in which $R^2$ has structure (IV) is known herein as propoxylated glycerol.

Among precursor polyols that are alkyl higher polyols, preferred are those with 10 or fewer carbon atoms; more preferred are those with 6 or fewer carbon atoms; more preferred are those with 3 or fewer carbon atoms; more preferred is glycerol.

More preferred precursor polyols are alkyl higher polyols and compounds having structure (III). It is noted that, if $n_1=n_2=n_3=0$ and if $R^2$ is either an alkyl group or an alkyl group having hydroxyl groups, then the compound having structure IV is an alkyl higher polyol.

A preferred group of precursor polyols are alkyl triols and alkoxylated alkyl triols. Among these, more preferred are glycerol and alkoxylated glycerols; more preferred are alkoxylated glycerols. Among alkoxylated glycerols, preferred are propoxylated glycerols.

Another class of suitable phosphate ester compounds are those that contain urethane linkages. Phosphate ester compounds containing urethane linkages are made by reacting one or more suitable phosphate-functional polyol with one or more polyisocyanate, preferably including one or more diisocyanate. Preferably, the amount of polyisocyanate is kept low enough so that some or all of the reaction products are phosphate-functional polyols. Alternatively, the polyol may be first reacted with the polyisocyanate to make an —OH terminated prepolymer which is then reacted with polyphosphoric acid. The phosphate ester compound with urethane linkages will have a number average molecular weight in the range of 1,000 to 6,000 and preferably in the range of 1,200 to 4,000, and more preferably in the range of 1,400 to 3,000.

In some embodiments, the phosphate ester compound is the reaction product of reactants including a precursor polyol and a phosphoric-type acid, the phosphate ester compound having the structure (I).

Preferably, the amounts of phosphoric-type acid and precursor polyol are chosen to determine the ratio of $M_p:M_x$ as follows:

$M_{hy}$=number of hydroxyl groups per molecule of the precursor polyol $N_x=M_{hy}-2$ $M_x$=(moles of precursor polyol)×($N_x$)

$M_p$=moles of phosphorous atoms contained in the phosphoric-type acid

In some embodiments, the ratio of $M_p:M_x$ is 0.1:1 or higher, or 0.2:1 or higher, or 0.5:1 or higher, or 0.75:1 or higher. In some embodiments, the ratio of $M_p:M_x$ is 1.1:1 or less.

In some embodiments, the weight ratio of phosphoric-type acid to precursor polyol is 0.005:1 or higher, or 0.01:1 or higher, or 0.02:1 or higher. In some embodiments, the weight ratio of phosphoric-type acid to precursor polyol is 0.3:1 or lower, or 0.2:1 or lower, or 0.12:1 or lower.

In some embodiments, the phosphoric-type acid contains polyphosphoric acid. In some embodiments, the amount of polyphosphoric acid in the phosphoric-type acid is, by weight based on the weight of the phosphoric-type acid, 75% or more, or 80% or more, or 90% or more. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppo×142)/Fppa, expressed as a percentage. Then, the grade of that polyphosphoric acid is the ratio, expressed as a percentage: Grade=PCppo/72.4.

In some embodiments, polyphosphoric acid is used that has grade of 100% or higher, or 110% or higher. In some embodiments, polyphosphoric acid is used that has grade of 150% or lower, or 125% or lower.

In some embodiments, the disclosed solvent-based adhesive compositions contain one or more phosphorous-free polyols in addition to the one or more phosphate-functional polyols.

Further information about suitable phosphate esters and their preparation can be found in PCT Publication No. WO/2015/168670, which is herein incorporated by reference in its entirety.

Solvent-Based Adhesive Compositions

In some embodiments, the polyols and the phosphate ester compound are combined to form the hydroxyl component (B). The hydroxyl component (B) is diluted in a solvent to form a diluted resin mixture which can be at 55 to 95% solids and which on further dilution will have an application solid content of from 25 to 55 weight percent, or from 30 to 45 weight percent, or from 35 to 40 weight percent, based on the total weight of the diluted hydroxyl component (B). The diluted hydroxyl component (B) mixture can then be cured with the isocyanate component (A) at a mix ratio ((A):(B), by weight) of from 100:8 to 100:15.

As gathered from the foregoing, the present disclosure contemplates the employment of two components, which preferably are mixed using a suitable mixer (e.g., an electrically, pneumatically, or an otherwise powered mechanical mixer) prior to or during application to a substrate, to form the adhesive composition. Mixing may take place at any suitable time in the process, such as before, during, or as a result of the application process. All of the present steps may be carried out under ambient room temperature conditions. As desired, heating or cooling may be employed.

Methods for preparing a solvent-based adhesive composition are disclosed herein. In some embodiments, the methods include providing an isocyanate component (A) comprising an isocyanate curing agent, providing a hydroxyl component (B) comprising a polyol blend, comprising a polyester polyol and a polyether polyol, and a phosphate ester compound, curing the hydroxyl component (B) with the isocyanate component (A) at a mix ratio ((A):(B), by weight) of from 100:8 to 100:15, thereby forming the solvent-based adhesive composition. In some embodiments, the methods further comprise diluting the solvent-based adhesive composition in a solvent to form a diluted adhesive composition having an application solid content from 30 to 45 weight percent, or from 35 to 40 weight percent.

The disclosed adhesive compositions are useful for bonding substrates together. The substrates may be similar materials or dissimilar materials. Wet and dry bond lamination of a plurality of substrate layers is possible. The disclosed adhesive compositions can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the adhesive compositions may be done over an entire surface or only a portion of it, such as along an edge, or at intermittent locations. Once applied to the substrate, the compositions are dried, such as by application of heat and air flow, or some other suitable approaches for removing substantially all remaining solvent.

The disclosed adhesive compositions can be used on a wide variety of one or a plurality of suitable substrates such as high, low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. The adhesive compositions are particularly attractive for packaging and sealing applications. For example, a plastic film, metal film, or metallized plastic film can be laminated (e.g., over all or at least a portion of its surface, such as along its edges, or at intermittent locations) with the adhesive compositions of the disclosure. In some embodiments, food may be packaged for boil-in-bag preparation, or the resulting laminate might be used for sealing or packaging some other article. When heavy gauge foil is employed in the laminate structure the resulting laminate can be cold drawn to yield a cup or package which can be filled with food and then covered and sealed with a similar laminate structure to form a sealed container.

Examples of the Disclosure

The present disclosure will now be described in further detail by discussing Illustrative Examples ("IE") and Comparative Examples ("CE") (collectively "the Examples"). However, the scope of the present disclosure is not, of course, limited to the IEs.

Raw Materials

TABLE 1A

Raw Materials

| Material | Description | Supplier |
|---|---|---|
| ADCOTE ™ 577 | Polyurethane prepolymers based on polyester polyol and dissolved in ethyl acetate, solids content of 75 wt % | The Dow Chemical Company |
| ADCOTE ™ 577B | Polyester/polyether blend including BPA epoxy having solids content of 71 wt % | The Dow Chemical Company |
| MORFREE ™ C-411 | Polyester/polyether blend | The Dow Chemical Company |
| POLY-G ™ 30-112 | Polyether triol | Monument Chemical |
| PLURACOL ™ GP-430 | Polyether triol | BASF SE |
| PLURACOL ™ TP440 | Polyether triol | BASF SE |
| Trimethylolpropane | Triol | Sigma-Aldrich |
| Ethyl Acetate | Solvent | Sigma-Aldrich |
| Adipic Acid | Dicarboxylic Acid | Sigma-Aldrich |
| Neopentyl Glycol | Glycol | Sigma-Aldrich |
| 1,6-Hexanediol | Glycol | Sigma-Aldrich |
| Propylene Glycol | Glycol | Sigma-Aldrich |
| 115% Polyphosphoric Acid | Inorganic Acid | Sigma-Aldrich |
| VORANOL ™ CP450 | Polyether triol | The Dow Chemical Company |
| ISONATE ™ 125M | MDI Monomer | The Dow Chemical Company |
| Polyester Resin A (Example 1) | Polyester polyol | The Dow Chemical Company |
| Polyester Resin B (Example 2) | Polyester polyol | The Dow Chemical Company |
| Polyester Resin C (Example 3) | Polyester polyol | The Dow Chemical Company |
| Phosphoric acid | 85% phosphoric acid | Aldrich |
| MODAFLOW ™ 2100 | Leveling agent | Allnex |
| Phosphate ester of Example 4 | Phosphate ester compound, solids content 75 wt % | The Dow Chemical Company |
| PE | GF-19, high slip low density polyethylene film, thickness 25.4 micrometers (1.0 mil) | Berry Plastics Corp. |
| OPP | Coextruded polypropylene (75SLP) Bicor SLP oriented | Exxon Mobil |

TABLE 1A-continued

Raw Materials

| Material | Description | Supplier |
|---|---|---|
| | polypropylene, non-heat sealable, thickness 19 micrometers (0.75 mils) | |
| Met-OPP | Metallized oriented polypropylene film, heat sealable, thickness 18 micrometers | Taghleef Industries, Inc. (AET Films) |
| PET (92LBT) | Polyester, poly(ethylene glycol-terephthalate), thickness 23 micron (92 Gauge) | E. I. du Pont de Nemours and Company |
| CPP | Cast polypropylene, thickness 2 mil and 3 mil | The Dow Chemical Company |
| PRELAM | 12 micrometer (48 Gauge) Polyester (PET) Film laminated to 0.00035 mil Al Foil with ADCOTE ™/Coreactant F at 3.26 g/m² (2.00 lbs/ream) | The Dow Chemical Company |

Polyester Polyol Resins

Three polyester polyol resins employed in the Examples are summarized in Table 1B.

TABLE 1B

Polyester Polyol Resin Compositions

| Monomer/ Intermediate | Polyester Resin A (Example 1) | Polyester Resin B (Example 2) | Polyester Resin C (Example 3) |
|---|---|---|---|
| Adipic Acid | 47.11% | 51.37% | 52.60% |
| Neopentyl Glycol | 52.89% | 13.80% | 9.37% |
| 1,6-Hexanediol | | 34.83% | 25.75% |
| Propylene Glycol | | | 12.28% |
| % Solids | 100.0 | 100.0 | 100.0 |
| AV | <2.0 | <2.0 | <1.0 |
| OHN | 225 | 112 | 142.5 |
| Viscosity @ 25° C. (cps) | 2,500 | 450 | 1,650 |

The polyester resins are prepared by charging the listed monomers/intermediates to a reactor and slowly heating to 155° C., holding for 1 hour at 155° C., and then heating to 225° C. while removing water via distillation and monitoring acid value ("AV") and viscosity. When AV is <2.0, or 1.0, the resin is cooled to 60° C. and then packaged and final properties of the product are determined.

Example 4: Phosphate Ester Resin

A 1 L multi-neck round bottom flask was dried in an oven, flushed with dry $N_2$ for 30 minutes, then charged with 150 grams of VORANOL™ CP 450 polyether polyol and placed under an $N_2$ sweep of 70 mL/min A syringe was loaded with 4 grams of 115% Polyphosphoric acid (PPA). The PPA was added dropwise to the polyether polyol with strong agitation. A minimal temperature increase was observed. The reactor contents were heated to 100° C. for 1 hour then cooled to 45° C. 40 grams of ethyl acetate was added, followed by slow addition of 50 grams of ISONATE™ 125M diisocyanate. A significant exotherm was controlled with the application of an ice batch to keep the reaction pot below 75° C. and development of a yellow to amber color was observed. The reactor was then maintained at 65° C. for 1 hour, at which point the content was cooled and packaged. The product had the following properties: 76.0% Solids, OHN of 112 mg KOH/g, AV of 19.0 mg KOH/g, Viscosity at 25° C. of 1665 mPa·s, SEC Analysis of Mn 1700, Mw 4100, Polydispersity of 2.4, 4.4%≤500 Daltons, and 16.0%≤1000 Daltons.

Hydroxyl Component Preparation

Polyester polyols, polyether polyols, phosphate ester, and ethyl acetate are measured out according to the compositions provided in Table 2A and Table 2b below, and mixed on a jar roller until homogeneous. Detailed formulations of various hydroxyl component examples are listed in Table 2A and Table 2B.

TABLE 2A

Hydroxyl Component Compositions

| | IE1 (%) | IE2 (%) | IE3 (%) | IE4 (%) | IE5 (%) | IE6 (%) | IE7 (%) |
|---|---|---|---|---|---|---|---|
| POLY-G ™ 30-112 | 10.41 | 10.31 | 9.99 | 9.99 | 7 | 7 | 6.88 |
| PLURACOL ™ GP-430 | 10.41 | 10.31 | 9.99 | 9.99 | 7 | 7 | 6.88 |
| Trimethylolpropane | | | | 2.33 | 2.63 | 2.63 | |
| PLURACOL ™ TP440 | | | | 6.98 | 7.88 | 7.88 | 7.76 |
| MOR-FREE ™ C-411 | 48.51 | 48.02 | 46.55 | | | | |
| Polyester Resin A | | | | 37.24 | | | |
| Polyester Resin B | | | | | 42.03 | | |
| Polyester Resin C | | | | | | 42.03 | 44 |
| Phosphate ester of Example 4 | 1 | 2 | 5 | 5 | 5 | 5 | 5 |
| MODAFLOW ™ 2100 | 0.72 | 0.71 | 0.69 | 0.69 | 0.69 | 0.69 | 0.68 |
| Ethyl acetate | 28.94 | 28.65 | 27.77 | 27.77 | 27.77 | 27.77 | 28.8 |
| Total | 100.0 | 100.0 | 100.0 | 100.0 | 100.0 | 100.0 | 100.0 |
| % Solids | 71.0 | 71.0 | 71.0 | 71.0 | 71.0 | 71.0 | 70.0 |
| OHN (Theoretical) | 201.5 | 201.0 | 199.3 | 199.3 | 154.3 | 167.5 | 136.0 |
| OHN (Measured) | — | — | 214.6 | 210.7 | 158.9 | 175.2 | 144.5 |

| | IE8 | IE9 | IE10 | IE11 | IE12 | IE13 | IE14 |
|---|---|---|---|---|---|---|---|
| POLY-G ™ 30-112 | 6.88 | | 6.88 | | | | |
| PLURACOL ™ GP-430 | 6.88 | | | 6.88 | | 6.93 | |
| Trimethylolpropane | | 3.28 | 2.93 | 2.93 | 3.3 | 2.95 | 3.11 |
| PLURACOL ™ TP440 | | 9.83 | 8.8 | 8.8 | 9.9 | 8.86 | 9.34 |
| Polyester Resin C | 51.76 | 52.42 | 46.91 | 46.91 | 52.77 | 47.23 | 49.8 |
| Phosphate ester of Example 4 | 5 | 5 | 5 | 5 | 5.03 | 5.03 | 10.2 |
| MODAFLOW ™ 2100 | 0.68 | 0.68 | 0.68 | 0.68 | | | |
| Ethyl acetate | 28.8 | 28.8 | 28.8 | 28.8 | 29 | 29 | 27.55 |
| Total | 100.0 | 100.0 | 100.0 | 100.0 | 100.0 | 100.0 | 100.0 |
| % Solids | 70.0 | 70.0 | 70.0 | 70.0 | 70.0 | 70.0 | 70.0 |
| OHN (Theoretical) | 116.1 | 162.5 | 153.9 | 173.6 | 163.5 | 174.7 | 162.5 |
| OHN (Measured) | 122.7 | 173.4 | 129.0 | 180.2 | 173.4 | 180.2 | 163.7 |

Adhesive Composition Preparation

ADCOTE™ 577 is measured out into a glass jar. Next, an appropriate amount of ethyl acetate solvent (running solid set at 35%) is added and placed on a jar roller till homogeneous. Then, a hydroxyl component is added to the mixture of ADCOTE™ 577 in solvent and mixed on the rolling mill for an additional 20 minutes until the mixture is uniform.

Laminate Structure Preparation and Testing

Laminates are prepared using either an oil-based hand laminator or a LABO-COMBI™ 400 laminator. Various structures are evaluated, including oriented polypropylene ("OPP")/polyethylene ("PE"), polyester ("PET")/PE, metalized OPP/PE, Prelam (PET/aluminum foil ("Al"))/PE, Prelam/PET, Prelam/cast polypropylene ("CPP"), and PET/CPP.

For laminates prepared by hand lamination, the films are corona treated at a about 0.10 KW before lamination. Each adhesive sample is hand coated onto a primary film with coating weight adjusted to from 1.8 to 2.0 lbs/rm. The film and adhesive are then dried for 1 minute in the oven with temperature set at 80° C. The primary film is laminated to a secondary film on an oil based laminator with nip temperature set at 150° F. At least three laminates (8 inches×11 inches) are prepared for each structure with bond strip within the laminate to facilitate bond strength testing. The laminates are placed under 1 to 2 lbs weight in the order to apply equivalent pressure across the laminate sample, and the laminates were allowed to cure at room temperate (approximately 25° C.) for one week.

For laminates prepared using the LABO-COMBI™ 400 laminator, the nip temperature is set at 180° F., the line speed is set at 100 ft/min, the running solids is 35%, and the coating weight is adjusted to be about 1.8 to 2.0 lbs/rm. Around 100 ft of laminates are prepared for each formulation, with some bond strips inserted to facilitate bond testing. The formed laminates are allowed to cure at room temperate (approximately 25° C.) for one week.

Bond Strength Testing

T-peel bond strength is measured on a 1 inch sample strip at a rate of 10 inch/min on an Instron tensile tester with a 200 N loading cell. Three strips are tested for each laminate sample and high and mean strength are recorded together with the failure mode. In case of film tear and film stretch, the high value is reported and in other failure modes the average T-peel bond strength is reported. Typical failure modes include: "AF" indicating adhesive failure (i.e., adhesive with primary substrate); "AT" indicating adhesive transfer (i.e., adhesive with secondary substrate); "AS" indicating adhesive split (i.e., cohesive failure of adhesive); "FT" indicating film tear (i.e., destruct bond); "FS" indicating film stretch (i.e., destruct bond); and "MT" indicating metal transfer.

Boil-in-Bag Testing

A cured laminate (9 inches×11 inches) is folded over to form a double layer such that the PE film of one layer is in contact with the PE film of the other layer. The edges are then trimmed with a paper cutter to obtain a folded piece about 5 inches×7 inches. The edges are then heat sealed to form a pouch with an interior size of 4 inches×6 inches. The pouches are then filled 100 mL of a 1/1/1 sauce (i.e., a blend of equal parts by weight of ketchup, vinegar, and vegetable oil) through the open edge. After filling, the pouch is sealed so as to minimize the air entrapment inside of the pouch. The filled pouches are then placed in boiling water and kept immersed in the water for 30 minutes. When completed, the extent of tunneling, delamination, and/or leakage is compared with marked pre-existing flaws. The pouches are then emptied and at least three 1 inch strips are cut from the pouches and T-peel bond strength is measured as soon as possible thereafter.

Detail adhesive formulations, mix ratio and bond strength data are summarized in the following tables. Table 3a, Table 3b, and Table 3c summarize performance data of laminates prepared by hand lamination.

TABLE 3a

Bond strength of laminates prepared by hand lamination.

| Example No. | CE15 | | IE16 | | IE17 | | IE18 | |
|---|---|---|---|---|---|---|---|---|
| Side A | ADCOTE ™ 577 | | ADCOTE ™ 577 | | ADCOTE ™ 577 | | ADCOTE ™ 577 | |
| Side B | ADCOTE ™ 577B | | IE1 | | IE2 | | IE3 | |
| Mix ratio | 100:8.8 | | 100:8.8 | | 100:8.8 | | 100:8.8 | |

| | Bond strength (g/inch) Cured at 25° C. 50% RH | | | | | | | |
|---|---|---|---|---|---|---|---|---|
| Laminate structure | 1 Day | 7 Days | 1 Day | 7 Days | 1 Day | 7 Days | 1 Day | 7 Days |
| OPP/GF-19 | 1291, FT | 1387, FT | 1320, FT | 598, FT | 1396, FT | 780, FT | 1208, FT/FS | 1384, FT |
| 92LBT/GF-19 | 1391, FT/FS | 931, FT/AS | 981, FT | 863, FT | 1401, FT | 1223, FT | 1314, FT/FS | 1372, FT |
| Met-OPP/GF-19 | 1352, FS | 1453, FT/FS | 1244, FT | 1503, FS | 1327, FT | 1505, FS | 1219, FT | 1306, FT |
| Prelam/GF-19 | 1209, FT/FS | 1295, FT | 1278, FT | 948, FT/FS | 1316, FS | 1150, FT | 1245, FT | 1507, FT |
| 92LBT/2 mil CPP | 1642, FT | 1346, FT/AS | 1579, FT | 1251, FT | 1560, FT | 1717, FT | 1885, FT | 1658, FT |

TABLE 3b

Bond strength of laminates prepared by hand lamination.

| Example No. | IE19 | | IE20 | | IE21 | | IE22 | |
|---|---|---|---|---|---|---|---|---|
| Side A | ADCOTE ™ 577 | | ADCOTE ™ 577 | | ADCOTE ™ 577 | | ADCOTE ™ 577 | |
| Side B | IE 4 | | IE 5 | | IE 6 | | IE 7 | |
| Mix ratio | 100:8.8 | | 100:11.6 | | 100:10.5 | | 100:12.8 | |

| | Bond strength (g/inch) Cured at 25° C. 50% RH | | | | | | | |
|---|---|---|---|---|---|---|---|---|
| Laminate structure | 1 Day | 7 Days | 1 Day | 7 Days | 1 Day | 7 Days | 1 Day | 7 Days |
| OPP/GF-19 | 1362, FS/FT | 747, FT | 1279, FT | 815, FT | 1348, FS | 643, FT | 1037, FT | 996, FT |
| 92LBT/GF-19 | 884, FT/AS | 975, FT/FS | 1356, FT | 691, FT | 573, AS | 1008, FS/AS | 1033, FT | 1288, FT |
| Met-OPP/GF-19 | 1284, FS | 1092, FT/MT | 1022, FS/AS | 1370, FT | 1226, FT/FS | 1233, FT | 936, FT | 759, MT |
| Prelam/GF-19 | 739, AS | 869, FS/AS | 963, FS | 1240, FT | 1147, FT/FS | 1417, FT | 995, FT | 1255, FT |
| 92LBT/2 mil CPP | 1184, FT | 788, FT | 1336, FS/AS | 747, AS | 2328, FS | 1167, FT | 722, AS | 695, AS |

TABLE 3c

Bond strength of laminates prepared by hand lamination.

| Example No. | IE 23 | | IE 24 | | IE 25 | | IE 26 | |
|---|---|---|---|---|---|---|---|---|
| Side A | ADCOTE™ 577 | | ADCOTE™ 577 | | ADCOTE™ 577 | | ADCOTE™ 577 | |
| Side B | IE 8 | | IE 9 | | IE 10 | | IE 11 | |
| Mix ratio | 100:15 | | 100:10.6 | | 100:14.3 | | 100:10.2 | |
| | Bond strength (g/inch) Cured at 25° C. 50% RH | | | | | | | |
| Laminate structure | 1 Day | 7 Days | 1 Day | 7 Days | 1 Day | 7 Days | 1 Day | 7 Days |
| OPP/GF-19 | 1242, FT | 1002, FT | 1096, FT/FS | 1372, FT | 1294, FS | 1410, FT | 1200, FT | 935, FT/AT |
| 92LBT/GF-19 | 1268, FT | 1366, FT | 535, AT | 954, FS/AS | 1205, FS | 1258, FS/FT | 1109, FS/FT | 800, FT/FS |
| Met-OPP/GF-19 | 1242, FT | 809, MT | 1124, FT | 1383, FT | 1128, FT/AS | 1178, FT | 1266, FS | 1091, FT/FS |
| Prelam/GF-19 | 1154, FT | 1312, FT | 960, FS/AS | 1049, FT | 1198, FS | 1004, FT | 1170, FT | 1023, FT/FS |
| 92LBT/2 mil CPP | 700, AS | 631, AS | 1696, FT | 2291, FT | 581, AS | 553, AS | 2078, FT | 1383, FT |

Table 4a and Table 4b summarize performance data of laminates prepared by LABO-COMBI™ 400 laminator.

TABLE 4a

Bond strength of laminates prepared by LABO-COMBI™ 400 laminator.

| Example No. | CE 27 | | | IE 28 | | | IE 29 | | |
|---|---|---|---|---|---|---|---|---|---|
| Side A | ADCOTE™ 577 | | | ADCOTE™ 577 | | | ADCOTE™ 577 | | |
| Side B | ADCOTE™ 577B | | | IE 1 | | | IE 12 | | |
| Mix ratio | 100:8.8 | | | 100:8.8 | | | 100:10.9 | | |
| | Bond strength (g/inch) Cured at 25° C. 50% RH | | | | | | | | |
| Laminate structure | 1 Day | 7 Days | Boil-in-bag (1/1/1) | 1 Day | 7 Days | Boil-in-bag (1/1/1) | 1 Day | 7 Days | Boil-in-bag (1/1/1) |
| OPP/GF-19 | 700, FT | 626, FT | 283, FT | 674, FT | 641, FT | 426, FT | 749, FT | 760, FT | 382, FT |
| 92LBT/GF-19 | 1874, FT/FS | 1738, FT/FS | 345, AS | 1859, FT/FS | 1611, FT/FS | 883, FT/AS | 1873, FT | 1666, FT/FS | 752, FT |
| Met-OPP/GF-19 | 573, FT | 782, FT | 274, MT | 659, FT | 811, FT | 149, AS | 554, FT/MT | 540, FT/MT | 294, FT |
| Prelam/GF-19 | 1569, FT/FS | 1532, FT/FS | 868, AS | 1334, FT/FS | 1359, FT/FS | 785, FS/AS | 1482, FS | 1308, FT | 674, FS/AS |
| Prelam/3 mil CPP | 1737, AT | 2058, FT | 994, FT/AS | 1595, AT | 1958, FT | 919, FS/AS | 2247, FT | 1885, FT | 833, FT/AS |
| 92LBT/3 mil CPP | 2568, FT | 2854, FT | 684, FT | 2036, FT | 2798, FT | CAN NOT SEPARATE | 3105, FT | 3107, FT/FS | 946, Fr |

TABLE 4b

Bond strength of laminates prepared by LABO-COMBI™ 400 laminator.

| Example No. | IE 30 | | | IE 31 | | | IE 32 | | |
|---|---|---|---|---|---|---|---|---|---|
| Side A | ADCOTE™ 577 | | | ADCOTE™ 577 | | | ADCOTE™ 577 | | |
| Side B | IE 13 | | | IE 9 | | | IE 14 | | |
| Mix ratio | 100:10.3 | | | 100:10.9 | | | 100:11.3 | | |
| | Bond strength (g/inch) Cured at 25° C. 50% RH | | | | | | | | |
| Laminate structure | 1 Day | 7 Days | Boil-in-bag (1/1/1) | 1 Day | 7 Days | Boil-in-bag (1/1/1) | 1 Day | 7 Days | Boil-in-bag (1/1/1) |
| OPP/GF-19 | 900, FT | 733, FT | 317, FT | 898, FT | 979, FT | 345, FT | 852, FT | 1074, FT | 429, FT |
| 92LBT/GF-19 | 1557, FT/FS | 1745, FT/FS | 755, FT | 1816, FT/FS, | 1738, FT/FS | 784, FT | 1853, FT | 1606, FT/FS | 288, AS |
| Met-OPP/GF-19 | 458, FT/MT | 615, FT/MT | 308, FT | 805, FT/MT, | 789, FT/MT | 396, FT | 484, FT/MT | 730, FT | 178, AS |

TABLE 4b-continued

| Bond strength of laminates prepared by LABO-COMBI™ 400 laminator. | | | | | | | | |
|---|---|---|---|---|---|---|---|---|
| Prelam/GF-19 | 1471, FT/FS | 1386, FS | 721, FS/AS | 1390, FT/FS | 1193, FT/FS | 736, FT/AS | 1789, FT/FS | 1394, FT/FS | 756, AS |
| Prelam/3 mil CPP | 2193, FT | 1784, FT | 829, FT/AS | 2027, FT | 1808, FT | 920, FT/AS | 2464, FT | 2593, FT | 997, FT/AS |
| 92LBT/3 mil CPP | 2623, FT | 2693, FT | 947, FT | 2877, FT/FS | 2827, FT | 1046, FT | 2343, FT | 2380, FS/FT | 908, FT |

In addition to the embodiments described above and those set forth in the Examples, many examples of specific combinations are within the scope of the disclosure, some of which are described below:

Embodiment 1

A solvent-based adhesive composition, comprising:

(A) an isocyanate component comprising an isocyanate curing agent; and (B) a hydroxyl component comprising:

a polyester polyol;

a polyether polyol; and a phosphate ester compound.

Embodiment 2

The solvent-based adhesive composition of any preceding or succeeding Embodiment, wherein the isocyanate curing agent comprises an isocyanate-terminated polyurethane prepolymer.

Embodiment 3

The solvent-based adhesive composition of any preceding or succeeding Embodiment, wherein the isocyanate-terminated polyurethane prepolymer is the reaction product of reactants comprising a polyester polyol and an aromatic isocyanate.

Embodiment 4

The solvent-based adhesive composition of any preceding or succeeding Embodiment, wherein the isocyanate-terminated polyurethane prepolymer has a NCO content of from 2.44 to 2.75 weight percent, as measured according to AFP-3003.

Embodiment 5

The solvent-based adhesive composition of any preceding or succeeding Embodiment, wherein the isocyanate-terminated polyurethane prepolymer has a viscosity of from 3,000 to 4,400 mPa·s, as measured according to ASTM D2196.

Embodiment 6

The solvent-based adhesive composition of any preceding or succeeding Embodiment, wherein the polyester polyol accounts for 30 to 65 percent by weight of the total weight of the hydroxyl component.

Embodiment 7

The solvent-based adhesive composition of any preceding or succeeding Embodiment, wherein the polyether polyol accounts for 5 to 35 percent by weight of the total weight of the hydroxyl component.

Embodiment 8

The solvent-based adhesive composition of any preceding or succeeding Embodiment, wherein the phosphate ester compound has the structure (I):

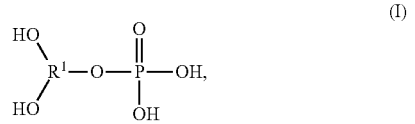

where $R^1$ is any organic group.

Embodiment 9

The solvent-based adhesive composition of any preceding or succeeding Embodiment, wherein $R^1$ has the structure (II):

where $R^1$ is the same as in structure (I).

Embodiment 10

The solvent-based adhesive composition of any preceding or succeeding Embodiment, wherein the phosphate ester compound comprises a urethane linkage.

Embodiment 11

The solvent-based adhesive composition of any preceding or succeeding Embodiment, wherein the phosphate ester compound accounts for 0.5 to 25 percent by weight of the total weight of the hydroxyl component.

Embodiment 12

The solvent-based adhesive composition of any preceding or succeeding Embodiment, further comprising a solvent.

Embodiment 13

The solvent-based adhesive composition of any preceding or succeeding Embodiment, wherein the solvent in the hydroxyl component accounts for 20 to 40 percent by weight of the total weight of the hydroxyl component.

Embodiment 14

The solvent-based adhesive composition of any preceding or succeeding Embodiment, wherein the solvent is selected from the group consisting of ethyl acetate, methyl ethyl ketone, methyl acetate, and combinations thereof.

Embodiment 15

A solvent-based adhesive composition, comprising:
(A) an isocyanate component comprising an isocyanate curing agent; and
(B) a hydroxyl component comprising:
a polyol blend comprising a polyester polyol and a polyether polyol; and
a phosphate ester compound.

Embodiment 16

The solvent-based adhesive composition of any preceding or succeeding Embodiment, wherein the polyol blend accounts for 35 to 90 percent by weight of the total weight of the hydroxyl component.

Embodiment 17

A method for preparing a solvent-based adhesive composition, the method comprising:
providing an isocyanate component (A) comprising an isocyanate curing agent;
providing a hydroxyl component (B) comprising a polyol blend, comprising a polyester polyol and a polyether polyol, and a phosphate ester compound;
curing the hydroxyl component (B) with the isocyanate component (A) at a mix ratio ((A):(B), by weight) of from 100:8 to 100:15, thereby forming the solvent-based adhesive composition.

Embodiment 18

The method for preparing a solvent-based adhesive composition of any preceding or succeeding Embodiment, further comprising diluting the solvent-based adhesive composition in a solvent to form a diluted adhesive composition having an application solid content from 30 to 45 weight percent.

Embodiment 19

The method for preparing a solvent-based adhesive composition of any preceding or succeeding Embodiment, further comprising diluting the solvent-based adhesive composition in a solvent to form a diluted adhesive composition having an application solid content from 35 to 40 weight percent.

Embodiment 20

The method for preparing a solvent-based adhesive composition of any preceding or succeeding Embodiment, wherein the diluted resin mixture has an application solid content of from 35 to 40 weight percent, based on the total weight of the diluted resin mixture.

Embodiment 21

A laminate structure comprising the solvent-based adhesive composition of any preceding or succeeding Embodiment.

Embodiment 22

The laminate structure according to any preceding or succeeding Embodiment, further comprising a metal substrate.

Embodiment 23

The laminate structure according to any preceding or succeeding Embodiment, further comprising a polyolefin substrate.

The invention claimed is:
1. A solvent-based adhesive composition, comprising:
(A) an isocyanate component comprising an isocyanate curing agent; and
(B) a hydroxyl component comprising:
a polyester polyol;
a polyether polyol; and
a phosphate ester compound,
wherein the polyester polyol accounts for from 30 to 65 percent by weight of the total weight of the hydroxyl component (B), and the polyether polyol accounts for from 5 to 35% by weight of the total weight of the hydroxyl component (B), wherein the phosphate ester compound has the structure (I):

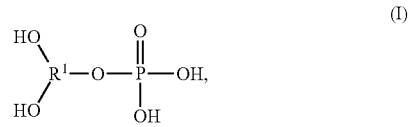

where $R^1$ is any organic group, and wherein the phosphate ester compound accounts for from 0.5 to 25 percent by weight of the total weight of this hydroxyl component.

2. The solvent-based adhesive composition of claim 1, wherein the isocyanate curing agent comprises an isocyanate-terminated polyurethane prepolymer.

3. The solvent-based adhesive composition of claim 1, wherein the isocyanate-terminated polyurethane prepolymer is the reaction product of reactants comprising a polyester polyol and an aromatic isocyanate.

4. The solvent-based adhesive composition of claim 1 wherein $R^1$ has the structure (II):

where $R^1$ is the same as in structure (I).

5. The solvent-based adhesive composition of claim 1, wherein the phosphate ester compound comprises a urethane linkage.

6. A solvent-based adhesive composition, comprising:
(A) an isocyanate component comprising an isocyanate curing agent; and (B) a hydroxyl component comprising:
a polyol blend comprising a polyester polyol and a polyether polyol; and
a phosphate ester compound,
wherein the polyester polyol accounts for from 30 to 65% by weight of the total weight of the hydroxyl component (B), and the polyether polyol accounts for from 5 to 35% by weight of the total weight of the hydroxyl component (B), wherein the phosphate ester compound has the structure (I):

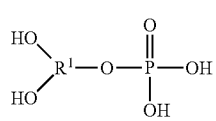

(I)

where $R^1$ is any organic group, and wherein the phosphate ester compound accounts for from 0.5 to 25 percent by weight of the total weight of the hydroxyl component.

7. A method for preparing a solvent-based adhesive composition, the method comprising:
providing an isocyanate component (A) comprising an isocyanate curing agent;
providing a hydroxyl component (B) comprising a polyol blend, comprising a polyester polyol and a polyether polyol, and a phosphate ester compound;
curing the hydroxyl component (B) with the isocyanate component (A) at a mix ratio ((A):(B), by weight) of from 100:8 to 100:15, thereby forming the solvent-based adhesive composition,
wherein the polyester polyol accounts for from 30 to 65% by weight of the total weight of the hydroxyl component (B), and the polyether polyol accounts for from 5 to 35% by weight of the total weight of the hydroxyl component (B), wherein the phosphate ester compound has the structure (I):

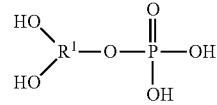

(I)

where $R^1$ is any organic group, and wherein the phosphate ester compound accounts for from 0.5 to 25 percent by weight of the total weight of the hydroxyl component.

8. The method for preparing a solvent-based adhesive composition of claim 7, further comprising diluting the solvent-based adhesive composition in a solvent to form a diluted adhesive composition having an application solid content from 30 to 45 weight percent.

* * * * *